(12) United States Patent
Gebhardt et al.

(10) Patent No.: US 7,171,860 B2
(45) Date of Patent: Feb. 6, 2007

(54) ATTACHMENT AND CORIOLIS MASS FLOWMETER WITH THIS ATTACHMENT

(75) Inventors: Jorg Gebhardt, Mainz (DE); Frank Kassubek, Rheinfelden (DE); Rene Friedrichs, Ladenburg (DE); Wolfgang Waldi, Nussloch (DE); Kuno Hug, Heidelberg (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/972,681

(22) Filed: Oct. 26, 2004

(65) Prior Publication Data
US 2005/0115335 A1    Jun. 2, 2005

(30) Foreign Application Priority Data
Oct. 31, 2003    (DE)    ................ 103 51 312

(51) Int. Cl.
*G01F 1/84* (2006.01)
(52) U.S. Cl. ................................. 73/861.357
(58) Field of Classification Search ........... 73/861.357, 73/861.356, 861.355
See application file for complete search history.

(56) References Cited

U.S. PATENT DOCUMENTS

| | | | | |
|---|---|---|---|---|
| 5,398,554 A | * | 3/1995 | Ogawa et al. | 73/861.357 |
| 5,945,609 A | * | 8/1999 | Kashimura et al. | 73/861.357 |
| 6,401,548 B1 | * | 6/2002 | Drahm et al. | 73/861.357 |
| 6,904,667 B2 | * | 6/2005 | Lanham et al. | 29/595 |

* cited by examiner

*Primary Examiner*—Jewel Thompson
(74) *Attorney, Agent, or Firm*—Buchanan Ingersoll & Rooney PC (57) ABSTRACT

A description is given of a Coriolis mass flowmeter, with a measuring pipe oscillating in coupled flexural and torsional modes. Mechanically connected to the measuring pipe is an attachment which is formed rotationally symmetrically with respect to an axis of rotational symmetry and can be induced to undergo the torsional oscillations of the measuring pipe. The attachment is a multipart body comprising hollow profile rails and/or beams with a closed hollow cross section. The axis of rotational symmetry of the attachment runs parallel to the straight line (8) (central axis) defined by the centre points (4*a*, 6*a*) of the cross-sectional areas (4, 6) of the inlet and outlet of the measured section, or coincide with this line.

26 Claims, 5 Drawing Sheets

ATTACHMENT AND CORIOLIS MASS FLOWMETER WITH THIS ATTACHMENT

The invention relates to an attachment for a Coriolis mass flowmeter (CFM), and to a Coriolis mass flowmeter with such an attachment.

CMFs induce the measuring pipe through which the fluid flows to perform a periodic motion—typically flexural oscillations—and measure the force effect of the fluid on the pipe wall at at least two points. From the phase difference of the measuring signals at the measuring points, the mass flow can be determined.

However, the force effect of the fluid on the pipe wall caused by the flow (this is the Coriolis effect) is very small in comparison with other forces occurring. To be able to distinguish the measuring effect from the background and interference, the device therefore has to meet high requirements with respect to symmetry of the construction, etc. In particular, however, the CMF must be vibrationally isolated as much as possible from its surroundings (in particular the pipeline in which it is installed and the properties of which cannot be influenced). Such isolation is also referred to as "balancing" of the CMF.

In the prior art, there are many attempts to achieve balancing, by using double-pipe constructions and/or bent measuring pipes. These can achieve balancing over a wide range of densities of the fluid. In process engineering terms, however, single-pipe, non-bent measuring pipes are to be preferred. With these, there are three typical approaches (for an overview, cf. the article "Einrohrtechnik bei Coriolis-Massemessern—eine Standortbestimmung" [Single-pipe technique for Coriolis mass meters—locational determination], W. Drahm, atp 42, 7 (2000) p. 20):

Fixed Symmetrical Installation

Here, it is intended to ensure by special installation specifications that the CMF is coupled to the surroundings in a well-defined manner. The devices themselves have a great mass. Disadvantages are increased installation costs, difficult fastenings and great sensitivity of the device to external influences (for example low zero stability).

Flexural Counter-Oscillator

The vibration of the measuring pipe is compensated by attaching a flexural counter-oscillator. This oscillates in phase opposition to the measuring pipe and, in the ideal case, eliminates the oscillating motion of the centre of gravity. Then no forces couple out at the edge. Such compensation generally only works for one density of the fluid; with other densities, the mass ratios of the measuring pipe and the counter-oscillator are no longer right and the coupling to the surroundings increases greatly. Then the measuring accuracy also falls.

Torsional Counter-Oscillator

Instead of a flexural counter-oscillator, the natural frequency in bending is coupled to a torsional oscillation of the pipe. It has been proposed to achieve this by attaching to the measuring pipe a number of cantilevered masses, the centres of gravity of which lie in a common plane running perpendicularly in relation to the plane of the flexural oscillation through the longitudinal axis of the measuring pipe, but do not generally lie on this longitudinal axis. An alternative possibility is to attach a rigid eccentric trough, as shown in U.S. 2002/0117010A1. Since both modes of oscillation (flexural and torsional oscillating modes) are influenced in a similar way by the fluid mass, it is found that edge forces, i.e. flexural and torsional forces, can be compensated over a great range of densities. The balanced part of the measuring pipe is also referred to hereafter as the measured section. The measurement data are to be recorded only within the measured section balanced in such a way.

However, the balancing as proposed is obtained at the expense that, on account of the torsional oscillation, symmetrical torques (moments of torsion) act along the pipe axis on the ends of the measuring pipe on the inlet and outlet sides. Symmetrical means here that the moments of torsion on the inlet and outlet sides are of the same amount, but are oriented either in the same direction or in opposite directions. These axial moments of torsion have the effect that an undesired vibrational coupling to the surroundings of the CMF continues to take place.

It is has been proposed to overcome the coupling of the moments of torsion by mechanically connecting to the measuring pipe an attachment which is formed rotationally symmetrically with respect to an axis of rotational symmetry and can be made to undergo torsional oscillations of the same frequency, but opposite phase, as the modes of torsional oscillation of the measuring pipe. The axis of rotational symmetry of the attachment is to run parallel to the straight line defined by the centre points of the cross-sectional areas of the inlet and outlet of the measured section, which is referred to hereafter as the central axis for short; or coincide with this line. In the case of an entirely straight measuring pipe, the central axis coincides with the centre line of the measuring pipe and the axis of rotational symmetry of the measuring pipe.

Rotationally symmetrical means here symmetrical in the sense of a rotational symmetry of order n, as it is known. n is in this case a natural number. A body has a rotational symmetry of order n if its transforms are identical figures when it is rotated about the axis of rotational symmetry by an angle of 360°/n. For example, an elongated cuboid with square base areas has a rotational symmetry of order 4 with respect to a central axis running parallel to the direction of the longitudinal extent. This is so because the transforms of the cuboid are identical figures at rotational intervals of 90°. An elongated cuboid with rectangular end faces has a rotational symmetry of order 2. A solid or hollow cylinder, for example a measuring pipe, with homogeneous mass distribution, would have, as an extreme case of a rotational symmetry of order n, a rotational symmetry of an infinite order, since an identical figure of the hollow or solid cylinder is obtained with every rotation by any desired angle. This is also referred to as rotational symmetry.

The proposed attachment may be mirror-symmetrical with respect to a plane of symmetry oriented perpendicularly in relation to the axis of rotational symmetry and intersecting the central axis at the centre of the measured section. Mirror-symmetrical means that the attachment forms an image of itself when it is reflected at the plane of symmetry.

According to the prior art, attachments for vibrational compensation on measuring pipes of Coriolis mass flowmeters can only be produced from solid components, such as for example beams or bars or plates of solid material, firstly to achieve the necessary rigidity and secondly to achieve the necessary weight. As a consequence, vibration-compensated CMFs today are very heavy. However, proposed CMFs, as described above, no longer require large compensating masses.

It is therefore the object of the present invention to provide an attachment with which a balanced CMF can be produced, which can be made more easily and inexpensively and requires less material.

The object is achieved with regard to the attachment by the characterizing features of claim 1 and with regard to the CMF by the features of claim 10.

According to the invention, therefore, the attachment is a multipart body comprising hollow-profile rails and/or beams with a closed hollow cross section. The attachment may comprise in particular beams with a closed hollow cross-sectional profile, it being possible for the beams to have a round or oval or rectangular or meandering hollow cross-sectional profile.

An attachment according to the invention may, however, also comprise elongated profile rails, which may for example, but not exclusively, have a U shape or L shape or V shape.

The profile rails may be stiffened by bracings transversely to the direction of the longitudinal extent. The advantage of such a configuration is that it avoids disturbing low-frequency vibrations of the open edges.

In a particularly advantageous embodiment, the vibrational properties of the attachment can be set by the profile wall thickness and/or the torsional moments of area of the profile rails or the beams.

In the case of attachments according to the invention, the profile rails and/or beams may have clearances in which insert parts are inserted for weight compensation. The advantage is that other components of the CMF, such as for example sensors or actuators, become accessible from the outside through the clearances, but the weight loss caused by cutting out the clearance is balanced out again by the insert part. The vibrational properties of the attachment remain unchanged as a result. The insert parts may advantageously be hollow sleeves which are screwed or welded into the clearances.

A CMF according to the invention comprises a measuring pipe oscillating in coupled flexural and torsional modes, to which an attachment which is formed rotationally symmetrically with respect to an axis of rotational symmetry, can be induced to undergo torsional oscillations of the same frequency but opposite phase in relation to the torsional oscillating modes of the measuring pipe and is constructed in the way described above is mechanically connected to the measuring pipe, and the axis of rotational symmetry of the attachment runs parallel to the straight line (central axis) defined by the centre points of the cross-sectional areas of the inlet and outlet of the measured section, or coincides with this line.

The attachment may in this case be mirror-symmetrical with respect to a plane of symmetry oriented perpendicularly in relation to the axis of rotational symmetry and intersecting the central axis at the centre of the measured section.

In a particularly advantageous refinement, at least one further compensating part may be attached to the measuring pipe to compensate for flexural and/or torsional forces.

The attachment may be connected to the measuring pipe on the inlet and outlet sides, in particular to the ends of the measured section on the inlet and outlet sides, but within the measured section.

The further compensating part may also be attached to the measuring pipe within the measured section.

The attachment may enclose the measuring pipe at least in the region of the measured section, but it could also be arranged outside the measuring pipe, but be connected to it.

The Coriolis mass flowmeter may comprise a single, straight or bent measuring pipe, it being possible in particular for the measuring pipe to be bent in a U- or S- or V-shaped manner.

The attachment according to the invention may comprise at least a first segment, on the inlet side, a second segment, on the outlet side, and a third, central segment, each segment being formed rotationally symmetrically with respect to the axis of rotational symmetry. The torsional moment of area of the central segment is in this case of a greater amount than the torsional moments of area of the segments on the inlet and outlet sides.

Particularly advantageous is an embodiment in which the segments on the inlet and outlet sides act as torsion springs and the central segment acts as an inert mass.

Among the factors determining the vibrational properties of the attachment is its torsional moment of area with respect to the axis of rotational symmetry.

The torsional moment of area is a known parameter in mechanics and is described for example in Dubbel, Taschenbuch für den Maschinenbau [Pocketbook for mechanical engineering], eighteenth edition; Springer-Verlag Berlin, 1995, pages C27–C29. As indicated there for example in Table 7 on page C29, the torsional moment of area of thin-walled hollow bodies with a constant wall thickness is proportional to the product of the square of the area enclosed by the cross-sectional centre line multiplied by the wall thickness, divided by the size of the cross-sectional centre line. The angle of twist is inversely proportional to the torsional moment of area.

It is therefore advantageous if the torsional moment of area of the central segment of the attachment is greater than the torsional moments of area of the segments on the inlet and outlet sides. In the case of such an embodiment, it is then ensured that the segments on the inlet and outlet sides act as torsion springs and the central segment acts as a mass which twists little within itself.

Furthermore, in the case of the CMF according to the invention, the frequency and phase of the torsional mode of oscillation of the attachment can be set by the ratio of the amounts of the torsional moments of area of the central segment and of the segments on the inlet and outlet sides and also by the position of the transitions between the central segment and the segments on the inlet and outlet sides. The transitions between the central segment and the segments on the inlet and outlet sides may in this case take place in steps or continuously.

Further advantageous refinements and improvements of the invention can be taken from the subclaims.

The invention and further advantageous refinements and improvements of the invention are to be explained and described in more detail on the basis of the drawings, in which a number of exemplary embodiments of the invention are represented and in which.

Figure 1:
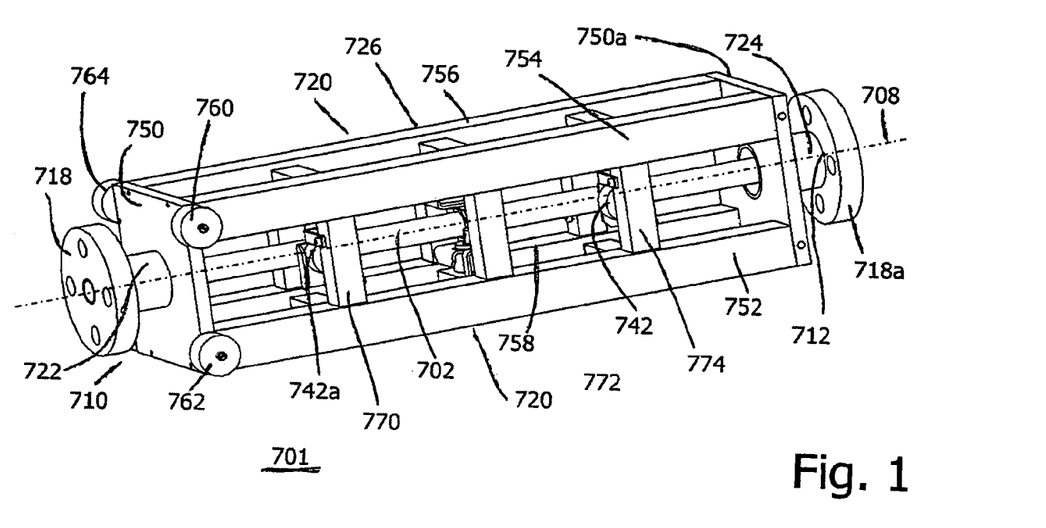
FIG. 1 shows a Coriolis mass flowmeter with an attachment according to the invention.

FIG. 1 shows a Coriolis mass flowmeter 701 with a single, straight measuring pipe 702. The central axis 708 of the measuring pipe 702 coincides here with the axis of rotational symmetry of the measuring pipe 702. Attached to the ends 710, 712 of the measuring pipe 702 on the inlet and outlet sides are the flanges 718, 718a for incorporating the meter 701 in a process pipeline system. The measured section extends here over the entire length of the measuring pipe between the flanges 718, 718a.

Connected to the measuring pipe 702 is an attachment 720, which is rotationally symmetrical of order 4 with respect to its axis of rotational symmetry, with the result that the attachment 720 surrounds the measuring pipe and with it here also the measured section 702 on all sides. The attachment 720 comprises a first segment 722, on the inlet side, a second segment 724, on the outlet side, and a third, central segment 726. Its axis of rotational symmetry coincides with the central axis of the measuring pipe 702.

The first segment 722, on the inlet side, and the second segment 724, on the outlet side, are formed by thin-walled hollow cylinders. The third, central segment 726 is a multipart composite body, which is configured with rotational symmetry of order 4 in relation to the central axis 708 of the measuring pipe. This body is formed as a cuboid, with approximately square end plates 750, 750a and four connecting elements 752, 754, 756, 758, forming the longitudinal edges of the cuboid and running parallel to the measuring pipe 702. The end plates 750, 750a have centrally arranged round holes for leading the measuring pipe through. On the inlet and outlet sides, the hollow cylinders 722, 724 forming the first and second segments are welded onto the end plates 750, 750a, but they can also be soldered on or connected by some other connecting technique. The cuboidal connecting elements 752, 754, 756, 758 are mechanically fastened to the plates 750, 750a, either welded, soldered or screwed.

Midway between the inlet end and outlet end and on the inlet and outlet sides, respective pairs of adjacent connecting elements 752, 754, 756, 758 are connected by further connecting elements arranged perpendicularly in relation to the direction of their longitudinal extent, with the result that in each case a frame-like bracing 772, 770, 774, which is oriented perpendicularly in relation to the central axis of the measuring pipe, is produced.

Fastened to the central bracing 772 is the excitation system; attached to the two bracings on the inlet and outlet sides are the sensors for picking up the state of vibration of the pipe.

The diameter of the hollow-cylindrical first and second segments 722, 724 is less than the edge length of the square end plates 750, 752. The first and second segments 722, 724 act as torsion springs, the third segment 726 acts as a mass. The frame-like bracings 772, 770, 774 achieve the effect of increased rigidity of the third segment with low weight.

Figure 2:
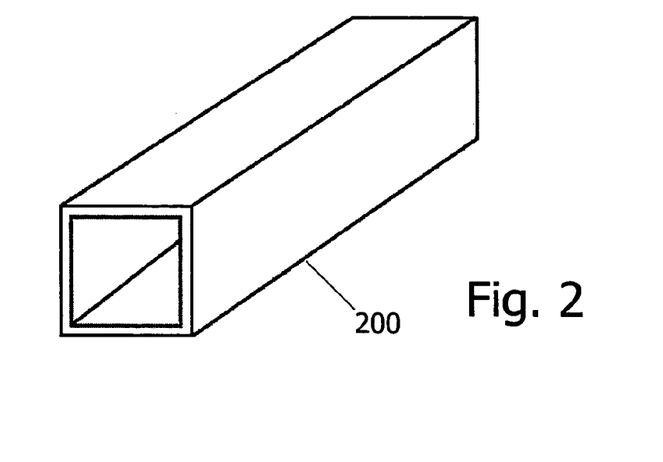
FIG. 2 shows the single view of a hollow profile beam for constructing an attachment according to the invention.
Figure 3:
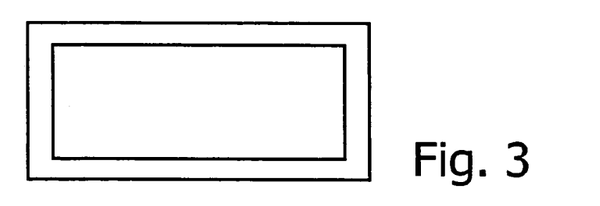
FIGS. 3 to 6 show various hollow profiles for producing attachments according to the invention.
Figure 4:
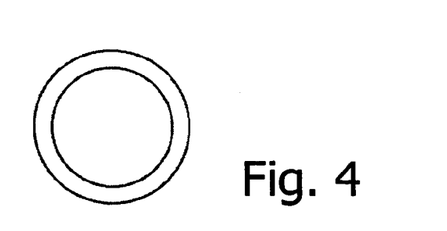
Figure 5:
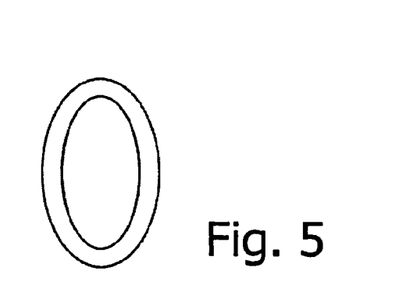
Figure 6:
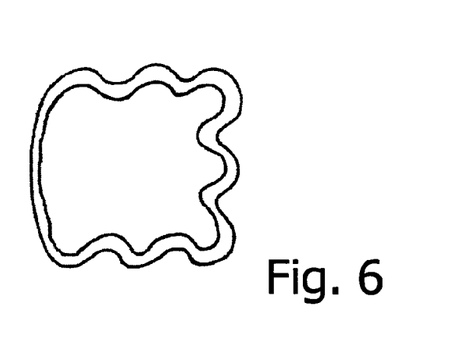

The connecting elements 752, 754, 756, 758 and also the further connecting elements are rectangular beams with a closed hollow profile, as shown in FIG. 2. FIGS. 3 to 6 show further possible forms of hollow profile which can be used for constructing an attachment according to the invention: rectangular (FIG. 3), round (FIG. 4), oval (FIG. 5) and meandering (FIG. 6).

Screwed onto the corners on the inlet side of the central segment 726 are cylindrical bodies 760, 762, 764, as adjusting masses. They are attached after final assembly of the meter and are selected in respect of weight and distance from the central segment 726 in such a way that the balancing is optimized. Depending on the requirement, adjusting masses may be attached at all eight corners, or only at some of the corners—as shown in FIG. 7.

The torsional oscillating properties of the attachment 720 can be set by the geometrical properties of the first and second segments 722, 724—that is to say their length, diameter and wall thickness—, by the geometrical properties of the central segment—in particular by its length and the edge length of the cuboid—and by the masses of the connecting elements 752, 754, 756, 758 and also by the additionally attached adjusting masses.

Figure 7:
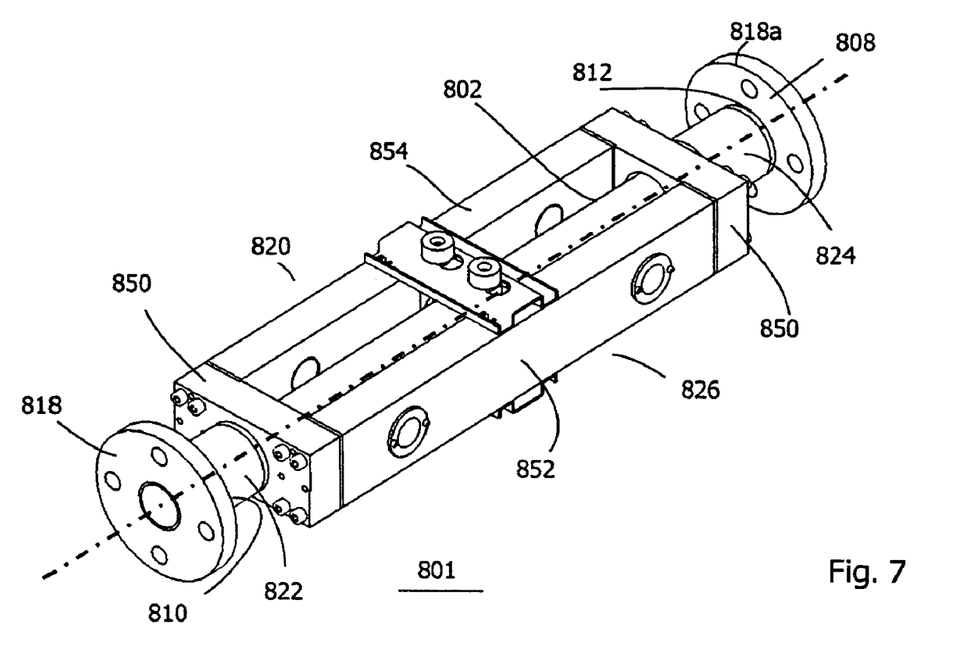
FIG. 7 shows a CMF with a further attachment according to the invention.

FIG. 7 shows a further alternative embodiment of a CMF with an attachment according to the invention.

FIG. 7 shows a Coriolis mass flowmeter 801 with a single, straight measuring pipe 802. The central axis 808 of the measuring pipe 802 coincides here with the axis of rotational symmetry of the measuring pipe 802. Attached to the ends 810, 812 of the measuring pipe 802 on the inlet and outlet sides are the flanges 818, 818a for incorporating the meter 801 in a process pipeline system. The measured section, that is to say that region of the measuring pipe in which the interaction between the medium flowing through the measuring pipe and the measuring pipe wall takes place, extends here over the entire length of the measuring pipe between the flanges 818, 818a.

Connected to the measuring pipe 802 is an attachment 820, which is rotationally symmetrical of order 2 with respect to its axis of rotational symmetry, with the result that the attachment 820 surrounds the measuring pipe 802 on all sides. The attachment 820 comprises a first segment 822, on the inlet side, a second segment 824, on the outlet side, and a third, central segment 826. Its axis of rotational symmetry coincides with the central axis of the measuring pipe 802.

The first segment 822, on the inlet side, and the second segment 824, on the outlet side, are formed by thin-walled hollow cylinders. The third, central segment 826 is a multipart composite body, which is configured with rotational symmetry of order 2 in relation to the central axis 808 of the measuring pipe.

This body is formed as a cuboid, with approximately square end plates 850, 850a and two connecting elements 852, 854, in the form of elongated hollow cuboids and running parallel to the measuring pipe 802. The connecting elements 852, 854 are respectively screwed to the end plates 850, 850a on the narrow sides of the latter. The height corresponds to the height of the end plates 850, 850a. Altogether, the end plates 850, 850a together with the connecting elements 852, 854 form a rectangular frame. The end plates are also elongated hollow cuboids.

The end plates 850, 850a have centrally arranged round holes for leading the measuring pipe through. On the inlet and outlet sides, the hollow cylinders 822, 824 forming the first and second segments are welded onto the end plates 850, 850a; they could also be soldered on.

The diameter of the hollow-cylindrical first and second segments 822, 824 is less than the edge length of the square end plates 850, 852. The first and second segments 822, 824 act as torsion springs, the third segment 826 acts as a mass.

The torsional oscillating properties of the attachment 820 can be set by the geometrical properties of the first and second segments 822, 824—that is to say their length, diameter and wall thickness—, by the geometrical properties of the central segment—in particular by its length and the edge lengths and also the ratio of width to height of the cuboid—and by the masses of the connecting elements 852, 854.

Altogether, the embodiment that is shown in FIG. 7 bears a similarity to the embodiment that is shown in FIG. 1. However, it can be produced more easily than that embodiment.

Respective pairs of clearances 880, 881 have been made in the longitudinal sides of the connecting elements 852, 854. Through these clearances, sensors for picking up the oscillation measuring signal, which are attached to the measuring pipe, can be led for example. However, making the clearances would have the effect of changing the weight, and consequently the vibrational properties of the attachment. Therefore, sleeves 882, 883 for weight compensation and stiffening the edges of the clearances are inserted into the clearances 880, 881 and screwed there.

Figure 8:
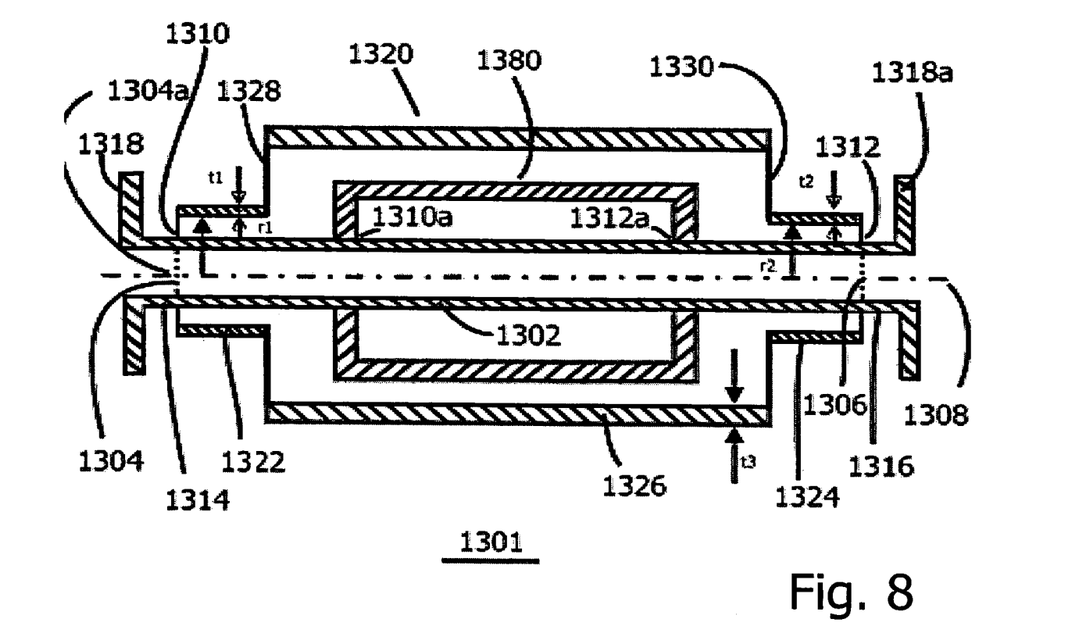
FIG. 8 shows a further CMF with an attachment according to the invention.

FIG. 8 shows a Coriolis mass flowmeter 1301 with a single, straight measuring pipe 1302. The measuring pipe 1302 is produced from one piece, but is functionally divided into a pipe extension 1314 on the inlet side, a pipe extension 1316 on the outlet side and the measured section in between, bounded by a measured-section inlet cross-sectional area 1304 and a measured-section outlet cross-sectional area 1306. A central axis 1308 of the measuring pipe 1302 is defined by their centre points 1304a, 1306a. Attached to the pipe extensions 1314, 1316 are the flanges 1318, 1318a for incorporating the meter 1301 in a process pipeline system.

Connected to the measuring pipe 1302 is an attachment 1320, with the result that the attachment 1320 surrounds the measuring pipe 1302 in the region of the measured section on all sides. The attachment 1320 is constructed as described in FIG. 1, with a central segment which is made up of hollow profile bodies according to the invention. It can also be constructed as described in FIG. 7.

The measuring pipe 1302 may, as customary in the prior art, consist of metal, for example titanium. The attachment 1320 may also consist of metal. It is welded onto the measuring pipe at the ends 1310, 1312 of the measured section on the inlet and outlet sides.

Attached to the measuring pipe 1302 is a further compensating part 1380 to compensate for flexural and/or torsional forces. The compensating part is formed as a pipe and fastened to the measuring pipe 1302 at connecting points 1310a and 1310b, for example by welding or screwing. The connecting points 1310a, 1312a for the compensating part 1380 to the measuring pipe 1302 consequently lie within the measured section.

The idea on which the arrangement that is shown in FIG. 8 is based is that the part of the measuring pipe which is compensated by the at least one compensating part with respect to flexural and/or torsional forces and the part which is compensated by the attachment with respect to the torsional moment may be congruent, or one of the two parts encloses the other. The larger of the two parts in each case defines the measured section. In the case of FIG. 8, the part which is compensated by the attachment defines the measured section.

Figure 9:
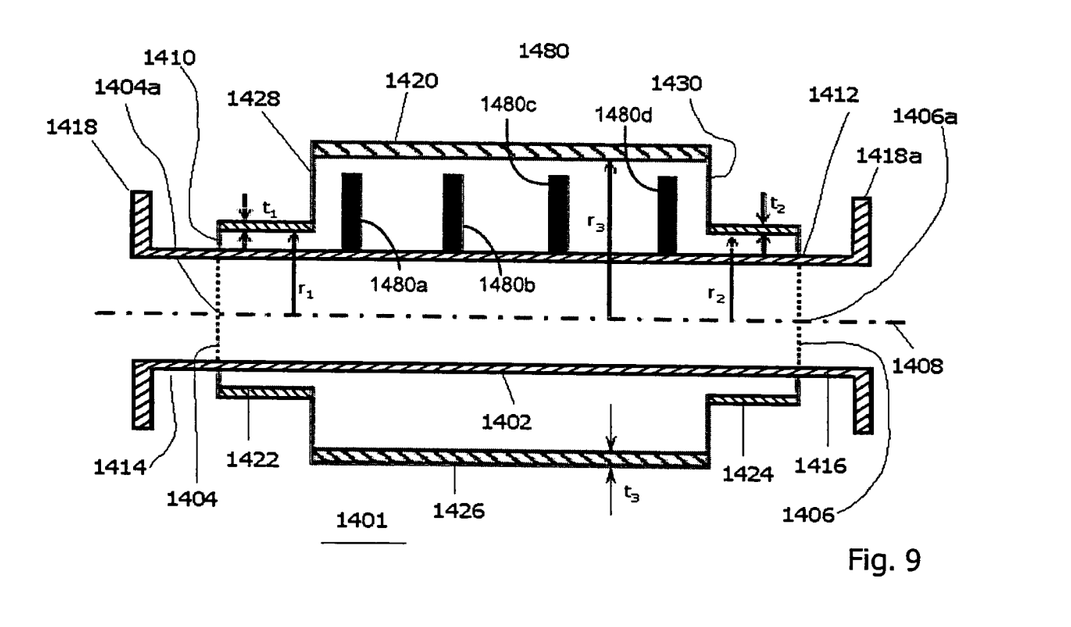
FIG. 9 shows a further CMF with an attachment according to the invention.

FIG. 9 shows a Coriolis mass flowmeter 1401 with a single, straight measuring pipe 1402. The measuring pipe 1402 is produced from one piece, but is functionally divided into a pipe extension 1414 on the inlet side, a pipe extension 1416 on the outlet side and the measured section in between, bounded by a measured-section inlet cross-sectional area 1404 and a measured-section outlet cross-sectional area 1406. A central axis 1408 of the measuring pipe 1402 is defined by their centre points 1404a, 1406a. The central axis 1408 coincides here with the axis of rotational symmetry of the measuring pipe 1402. Attached to the pipe extensions 1414, 1416 are the flanges 1418, 1418a for incorporating the meter 1401 in a process pipeline system.

Connected to the measuring pipe 1402 is an attachment 1420, with the result that the attachment 1420 surrounds the measuring pipe 1402 in the region of the measured section on all sides. The attachment 1420 is constructed as described in FIG. 1, with a central segment which is made up of hollow profile bodies according to the invention. It could also be constructed as described in FIG. 7. Its axis of rotational symmetry coincides with the central axis 1408 of the measuring pipe 1402.

The measuring pipe 1402 may, as customary in the prior art, consist of metal, for example titanium. The attachment 1420 may also consist of metal. It is welded onto the measuring pipe at the ends 1410, 1412 of the measured section on the inlet and outlet sides.

Attached to the measuring pipe 1402 as further compensating parts are four plates 1480a, 1480b, 1480c, 1480d, eccentrically with respect to the central axis 1408 on the measuring pipe. They bring about the effect of compensating for flexural and/or torsional forces on the measuring pipe 1402 in the way already proposed earlier. The plates 1480a, b, c, d are arranged in such a way that they lie within the measured section and within the central segment 1426 of the attachment 1420.

The invention claimed is:

1. Attachment for a Coriolis mass flowmeter, wherein the attachment is a multipart body having a rotational symmetry with a finite order, the multipart body comprising hollow-profile rails and/or beams with a closed hollow cross section;
   wherein the profile rails and/or beams have clearances in which insert parts are inserted for weight compensation; and
   wherein the insert parts are hollow sleeves which are screwed or welded into the clearances.

2. Attachment according to claim 1, wherein the attachment comprises beams with a closed hollow cross-sectional profile.

3. Attachment according to claim 2, wherein the beams have a round or oval rectangular or meandering hollow cross-sectional profile.

4. Attachment according to claim 1, wherein the attachment comprises elongated profile rails.

5. Attachment according to claim 4, wherein the profile rails have a U shape or L shape or V shape.

6. Attachment according to claim 5, wherein the profile rails are stiffened by bracings transversely to the direction of the longitudinal extent.

7. Attachment according to claim 1, wherein vibrational properties of the attachment can be set by the profile wall thickness and/or the torsional moments of area of the profile rails or the beams.

8. Coriolis mass flowmeter with a measuring pipe oscillating in coupled flexural and torsional modes, to which an attachment for a Coriolis mass flowmeter, wherein the attachment is a multipart body having a rotational symmetry with a finite order, the multipart body comprising hollow-profile rails and/or beams with a closed hollow cross section, which is formed rotationally symmetrically with respect to an axis of rotational symmetry, can be induced to undergo torsional oscillations of the same frequency but opposite phase in relation to the torsional oscillating modes of the measuring pipe, mechanically connected to the measuring pipe, and the axis of rotational symmetry of the attachment runs parallel to the straight line (central axis) defined by the centre points of the cross-sectional areas of the inlet and outlet of the measured section, or coincide with this line, wherein at least one further compensating part is attached to the measuring pipe to compensate for flexural and/or torsional forces.

9. Coriolis mass flowmeter according to claim 8, wherein the attachment is mirror-symmetrical with respect to a plane of symmetry oriented perpendicularly in relation to the axis of rotational symmetry and intersecting the central axis at the centre of the measured section.

10. Coriolis mass flowmeter according to claim 8, wherein the attachment is connected to the measuring pipe on the inlet and outlet sides.

11. Coriolis mass flowmeter according to claim 10, wherein the attachment is connected to the measuring pipe at the ends of the measured section on the inlet and outlet sides.

12. Coriolis mass flowmeter according to claim 10, wherein the attachment is connected to the measuring pipe within the measured section.

13. Coriolis mass flowmeter according to claim 8, wherein the attachment encloses the measuring pipe at least in the region of the measured section.

14. Conolis mass flowmeter according to claim 8, wherein the attachment is arranged outside the measuring pipe, but is connected to it.

15. Coriolis mass flowmeter according to claim 8, wherein the mass flowmeter comprises a single, straight measuring pipe.

16. Coriolis mass flowmeter according to claim 8, wherein the measuring pipe comprises a bent measuring pipe.

17. Coriolis mass flowmeter according to claim 16, wherein the measuring pipe is bent in a U- or S- or V-shaped manner.

18. Coriolis mass flowmeter according to claim 8, wherein the attachment comprises at least a first segment, on the inlet side, a second segment, on the outlet side, and a third, central segment, each segment being formed rotationally symmetrically with respect to the axis of rotational symmetry.

19. Coriolis mass flowmeter according to claim 8, wherein at least one segment of the attachment is a multipart composite body.

20. Coriolis flowmeter according to claim 19, wherein the multipart composite body comprises elongated components which run parallel in relation to the axis of rotational symmetry and are held on plates running perpendicularly in relation to the measuring pipe axis.

21. Coriolis mass flowmeter according to claim 8, wherein cantilevered masses attached eccentrically with respect to the central axis are attached to the measuring pipe as further compensating parts.

22. Coriolis mass flowmeter with a measuring pipe oscillating in coupled flexural and torsional modes, to which an attachment for a Coriolis mass flowmeter, wherein the attachment is a multipart body having a rotational symmetry with a finite order, the multipart body comprising hollow-profile rails and/or beams with a closed hollow cross section, which is formed rotationally symmetrically with respect to an axis of rotational symmetry, can be induced to undergo torsional oscillations of the same frequency but opposite phase in relation to the torsional oscillating modes of the measuring pipe, mechanically connected to the measuring pipe, and the axis of rotational symmetry of the attachment runs parallel to the straight line (central axis) defined by the centre points of the cross-sectional areas of the inlet and outlet of the measured section, or coincide with this line, wherein a further compensating part is attached to the measuring pipe within the measuring section.

23. Coriolis mass flowmeter with a measuring pipe oscillating in coupled flexural and torsional modes, to which an attachment for a Coriolis mass flowmeter, wherein the attachment is a multipart body having a rotational symmetry with a finite order, the multipart body comprising hollow-profile rails and/or beams with a closed hollow cross section, which is formed rotationally symmetrically with respect to an axis of rotational symmetry, can be induced to undergo torsional oscillations of the same frequency but opposite phase in relation to the torsional oscillating modes of the measuring pipe, mechanically connected to the measuring pipe, and the axis of rotational symmetry of the attachment runs parallel to the straight line (central axis) defined by the centre points of the cross-sectional areas of the inlet and outlet of the measured section, or coincide with this line,
   wherein the torsional moment of area of the central segment is of a greater amount than the torsional moments of area of the segments on the inlet and outlet sides;
   wherein the segments on the inlet and outlet sides act as torsion springs and the central segment acts as an inert mass; and
   wherein the frequency and phase of the torsional mode of oscillation of the attachment can be set by the ratio of the amounts of the torsional moments of area of the central segment and of the segments on the inlet and outlet sides and also by the position of the transitions between the central segment and the segments on the inlet and outlet sides.

24. Coriolis mass flowmeter with a measuring pipe oscillating in coupled flexural and torsional modes, to which an attachment for a Coriolis mass flowmeter, wherein the attachment is a multipart body having a rotational symmetry with a finite order, the multipart body comprising hollow-profile rails and/or beams with a closed hollow cross section, which is formed rotationally symmetrically with respect to an axis of rotational symmetry, can be induced to undergo torsional oscillations of the same frequency but opposite phase in relation to the torsional oscillating modes of the measuring pipe, mechanically connected to the measuring pipe, and the axis of rotational symmetry of the attachment runs parallel to the straight line (central axis) defined by the centre points of the cross-sectional areas of the inlet and outlet of the measured section, or coincide with this line, wherein the attachment is made to undergo torsional oscillations of the same frequency, but opposite phase, as torsional oscillations of the measuring pipe.

25. Coriolis mass flowmeter with a measuring pipe oscillating in coupled flexural and torsional modes, to which an attachment for a Coriolis mass flowmeter, wherein the attachment is a multipart body having a rotational symmetry with a finite order, the multipart body comprising hollow-profile rails and/or beams with a closed hollow cross section, which is formed rotationally symmetrically with respect to an axis of rotational symmetry, can be induced to undergo torsional oscillations of the same frequency but opposite phase in relation to the torsional oscillating modes of the measuring pipe, mechanically connected to the measuring pipe, and the axis of rotational symmetry of the attachment runs Parallel to the straight line (central axis) defined by the centre points of the cross-sectional areas of the inlet and outlet of the measured section, or coincide with this line, wherein the further compensating part is a rigid trough or a compensation pipe attached eccentrically with respect to the central axis.

26. Coriolis mass flowmeter with a measuring pipe oscillating in coupled flexural and torsional modes, to which an attachment for a Coriolis mass flowmeter, wherein the attachment is a multipart body having a rotational symmetry with a finite order, the multipart body comprising hollow-profile rails and/or beams with a closed hollow cross section, which is formed rotationally symmetrically with respect to an axis of rotational symmetry, can be induced to undergo torsional oscillations of the same frequency but opposite phase in relation to the torsional oscillating modes of the measuring pipe, mechanically connected to the measuring pipe, and the axis of rotational symmetry of the attachment runs parallel to the straight line (central axis) defined by the centre points of the cross-sectional areas of the inlet and outlet of the measured section, or coincide with this line, wherein further attachments are attached to the measuring pipe to perform other functions.

* * * * *